(12) United States Patent
Senn et al.

(10) Patent No.: US 12,269,693 B2
(45) Date of Patent: Apr. 8, 2025

(54) METHOD AND DEVICE FOR BUFFERING CONTAINERS IN A CONTAINER TREATMENT PLANT

(71) Applicant: KRONES AG, Neutraubling (DE)

(72) Inventors: Konrad Senn, Alteglofsheim (DE); Stefan Elsperger, Soechtenau (DE); Helmut Schuesslburner, Straubing (DE); Torsten Kilgenstein, Geisenfeld (DE)

(73) Assignee: KRONES AG, Neutraubling (DE)

( * ) Notice: Subject to any disclaimer, the term of this patent is extended or adjusted under 35 U.S.C. 154(b) by 174 days.

(21) Appl. No.: 18/002,793

(22) PCT Filed: Mar. 18, 2021

(86) PCT No.: PCT/EP2021/056918
§ 371 (c)(1),
(2) Date: Dec. 21, 2022

(87) PCT Pub. No.: WO2021/259525
PCT Pub. Date: Dec. 30, 2021

(65) Prior Publication Data
US 2023/0249922 A1 Aug. 10, 2023

(30) Foreign Application Priority Data

Jun. 22, 2020 (DE) .................... 10 2020 207 676.6

(51) Int. Cl.
*B65G 47/51* (2006.01)

(52) U.S. Cl.
CPC .. *B65G 47/5131* (2013.01); *B65G 2201/0235* (2013.01)

(58) Field of Classification Search
CPC ........ B65G 47/5131; B65G 2201/0235; B65G 2201/0247; B65G 47/082; B65G 47/5127; B65G 47/53; B65G 47/715; B65G 54/02
See application file for complete search history.

(56) References Cited

U.S. PATENT DOCUMENTS 10,252,899 B2 * 4/2019 Sauspreischkies ....... B67C 7/00
11,155,422 B2 * 10/2021 Berger ............... B65G 47/5109
(Continued)

FOREIGN PATENT DOCUMENTS

DE   102012021997 A1   5/2014
DE   102018211859 A1   1/2020
(Continued)

OTHER PUBLICATIONS

ISA European Patent Office, International Search Report Issued in Application No. PCT/EP2021/056918, Jun. 14, 2021, WIPO, 5 pages.

*Primary Examiner* — Gene O Crawford
*Assistant Examiner* — Abby A Jorgensen
(74) *Attorney, Agent, or Firm* — McCoy Russell LLP

(57) ABSTRACT

A method and a device for buffering containers in a container treatment plant. According thereto, containers are put into storage in a grouped manner in single file on at least one input conveyor belt, are moved in single file on a transversely adjoining buffering surface of shuttles, guided and driven individually on rails, having row pushers, in a buffering direction extending transversely to the input direction, and are taken out of storage on at least one output conveyor belt. Since, furthermore, containers are taken out of storage from the buffering surface by branching conveyor belts integrated in the buffering surface, transversely to the buffering direction and independently of the input conveyor belt and output conveyor belt, and/or are put into storage on the (Continued)

buffering surface, it is possible for container flows to be distributed flexibly and combined on the buffering surface.

18 Claims, 13 Drawing Sheets

(56) References Cited

U.S. PATENT DOCUMENTS

| | | | | |
|---|---|---|---|---|
| 11,511,946 B2* | 11/2022 | Gehin | ................... | B65G 47/82 |
| 2011/0220460 A1* | 9/2011 | Seger | ................... | B65G 47/71 |
| | | | | 198/442 |
| 2012/0024660 A1* | 2/2012 | Seger | ..................... | B65G 1/00 |
| | | | | 198/347.1 |
| 2016/0122135 A1* | 5/2016 | Bastian, II | ............. | B65G 37/00 |
| | | | | 198/347.1 |
| 2016/0244271 A1* | 8/2016 | Walter | ................ | B65G 47/715 |
| 2016/0340129 A1* | 11/2016 | Beesley | ................ | B65G 15/12 |
| 2022/0097982 A1* | 3/2022 | Uretsky | ................ | B65G 67/00 |
| 2023/0057810 A1* | 2/2023 | Duperray | ............. | B65G 47/841 |

FOREIGN PATENT DOCUMENTS

| | | | | |
|---|---|---|---|---|
| FR | 3075768 A1 | 6/2019 | | |
| JP | 2000255766 A * | 9/2000 | | |
| WO | WO-2014072531 A1 * | 5/2014 | ............. | B67C 3/007 |
| WO | WO-2016200751 A1 * | 12/2016 | ............. | B65B 35/44 |
| WO | WO-2019129968 A1 * | 7/2019 | | |
| WO | WO-2019158822 A1 * | 8/2019 | ........... | B65G 47/082 |
| WO | WO-2019228901 A1 * | 12/2019 | ........... | B65G 47/084 |
| WO | WO-2021150718 A1 * | 7/2021 | ......... | B65G 47/5113 |

* cited by examiner

METHOD AND DEVICE FOR BUFFERING CONTAINERS IN A CONTAINER TREATMENT PLANT

CROSS REFERENCE TO RELATED APPLICATIONS

The present application is a U.S. National Phase of International Application No. PCT/EP2021/056918 entitled "METHOD AND DEVICE FOR BUFFERING CONTAINERS IN A CONTAINER TREATMENT PLANT," and filed on Mar. 18, 2021. International Application No. PCT/EP2021/056918 claims priority to German Patent Application No. 10 2020 207 676.6 filed on Jun. 22, 2020. The entire contents of each of the above-listed applications are hereby incorporated by reference for all purposes.

TECHNICAL FIELD

The invention relates to a method for buffering containers in a container treatment system, in particular a filling system, according to the preamble of claim 1 and a device for buffering containers according to the preamble of claim 10.

BACKGROUND AND SUMMARY

A generic method and a generic device are known from DE 10 2018 211 859 A1. According thereto, single-row groups of containers, for example, consisting of beverage bottles, can be pushed over a buffer area by way of transversely aligned row pushers without back pressure. In connection with a container infeed and a container outfeed, each oriented to be transverse to the buffering direction, a buffer device is thus obtained which can buffer container flows with efficient use of space, for example, according to the first-in-first-out principle.

In order to make production processes and/or product change-over more flexible, there is furthermore an increasing need to be able to carry out specific treatment steps in filling systems with different treatment machines and/or in different inspection machines. Track switches, with which the respective product flow can be distributed to specific machines or, when arriving from different machines, can be forwarded and/or combined from partial flows, are then used for the optional integration of such machines. This generally requires a considerable amount of space and expenditure for equipment. In addition, buffer devices of the generic type may have to be placed multiple times at suitable points between track switches and/or distribution units, which likewise increases the space requirement and often causes the individual product flows to be routed in a complicated manner.

There is therefore a need for a buffer device of the generic type which can be integrated into filling systems more flexibly and/or with less space requirement.

The object posed is satisfied by a method according to claim 1 and by a device according to claim 10.

According thereto, the method is used for buffering containers, in particular bottles, in a container treatment system, in particular a filling system, in particular substantially without mutual back pressure of the containers. In this method, the containers are entered into storage grouped in a single row on at least one infeed conveyor belt, moved in a single row arrangement onto a buffer area adjoining in a transverse manner by rail-guided and individually driven shuttles with row pushers in a buffering direction running transverse to the infeed direction while maintaining a single lane arrangement spatially separate from one another, i.e. in buffer rows spatially separate from one other, and are removed from storage on at least one outfeed conveyor belt adjoining in a transverse manner in the buffering direction.

According to the invention, by way of branching conveyor belts integrated into the buffer area, containers are furthermore removed from storage from the buffer area and/or entered into storage on the buffer area, transverse to the buffering direction and independently of the infeed conveyor belt and the outfeed conveyor belt.

As a result, the branching conveyor belts can additionally distribute individual containers or groups of containers (rows of containers) in the region of the buffer area in the sense of leading them out and/or leading them in transverse to the buffering direction, i.e. in a substantially row-shaped, lane-shaped manner.

The at least one infeed conveyor belt leading into the infeed region and at least one branching conveyor belt leading in downstream in the buffering direction can be associated, for example, with different treatment machines and/or inspection machines arranged upstream of the buffer area.

Likewise, the at least one outfeed conveyor belt departing in the outfeed region and at least one branching conveyor belt departing upstream therefrom in the buffering direction can be associated with different treatment machines and/or inspection machines arranged downstream of the buffer area.

Different container flows can then be transported simultaneously and/or alternately in the region of the buffer area by entry into storage and/or removal from storage by way of the branching conveyor belts and, if necessary, be flexibly distributed/separated. The need for additional track switches/distribution units immediately upstream and/or downstream of the buffer area can thus be reduced and possibly even eliminated.

The containers entered into storage by at least one of the branching conveyor belts, on the one hand, and the containers entered into storage by the at least one infeed conveyor belt, on the other hand, are preferably treated, inspected or stored immediately upstream in a manner differing from one another, for example, with differently configured machines, and/or separately from one another.

This is to be understood to mean that, for example, a specific treatment, such as filling and closing the containers, is carried out immediately upstream of the infeed conveyor belt, and inspection of the immediately previously filled containers, for example, in the sense of a random inspection of individual containers, or labeling of the containers is carried out immediately upstream of one of the branching conveyor belts. This enables a particularly flexible combination and selective performance of different treatment and/or inspection steps in a filling system.

The containers removed from storage by at least one of the branching conveyor belts, on the one hand, and the containers removed from storage by the at least one infeed conveyor belt, on the other hand, are preferably treated, inspected or stored immediately downstream in a manner differing from one another, for example, with differently configured machines, and/or separately from one another.

For example, the containers could be inspected immediately downstream of one of the branching conveyor belts and packaged immediately downstream of the outfeed conveyor belt. In particular, it is conceivable to feed containers with one of the branching conveyor belts to an adjoining inspection unit and to lead containers recognized as being correct back onto the buffer area via at least one other branching conveyor belt.

In this case, it would also be possible to maintain the transport position of the individual containers with respect to the product flow in accordance with a first-in-first-out principle. For this purpose, for example, the advancement motion of the containers on the buffer area (in the buffering direction) could be synchronized with the dwell time of the containers on the branching conveyor belts and in the inspection unit or treatment unit connected thereto. This means that containers that were temporarily led out via one of the branching conveyor belts would be led back by way of another branching conveyor belt into the gap created there in the product flow on the buffer area.

The containers are preferably removed from storage and entered into storage again by way of at least two of the branching conveyor belts immediately before and/or after labelling, inspection, or buffering. Individual treatment steps and/or inspection steps can then be included or bypassed in a product-specific and/or format-specific manner. Time-consuming offline inspections for individual containers can also be integrated.

First containers with a first filling material and/or of a first container format are preferably transported on the buffer area and second containers with a second filling material and/or of a second container format are preferably removed from storage from a secondary buffer device by way of at least one of the branching conveyor belts and entered into storage in the row pushers. The first and the second containers are advanced as a mixed sequence, in particular in row pushers loaded with either the first or the second containers, to the outfeed region and are guided there in particular into transport aisles assigned either to the first or to the second containers.

In the event of a change of type/change of format, excess containers from the earlier production are preferably led out downstream by at least one of the branching conveyor belts to a remaining containers station, in particular with containers from earlier and new production running in in a manner adjoining one another without gaps. As a result, interruptions in the product flow can be prevented, at least on the infeed side, and any necessary change-over work can be carried out at individual shuttles/in the infeed while production continues.

During the removal from storage at at least one of the branching conveyor belts, emptied shuttles are preferably moved away from/lifted off the buffer area by way of a connectable vertical track switch and subsequently temporarily stored. This prevents shuttles that are not loaded with containers taking up part of the buffer area and thereby reducing the storage capacity of the buffer area. Furthermore, it can be prevented that unloaded shuttles, also known synonymously for the sake of comprehensibility as empty shuttles, impede the process of removing the containers from storage in the outfeed region, i.e. onto the at least one outfeed conveyor belt.

The shuttles loaded with containers are there moved in the buffering direction in particular on a lower level/tier defined by the buffer area and the empty shuttles are moved back again in the direction opposite to the buffering direction on an upper level/tier disposed thereabove.

For this purpose, the empty shuttles are preferably driven along vertically curved curve segments and/or pivoted about horizontal axes so that the empty shuttles return upside down in the upper level.

When entered into storage at at least one of the branching conveyor belts, empty shuttles to be loaded with containers are preferably moved/lowered onto the buffer area by way of a connectable vertical track switch after the empty shuttles have been temporarily stored. This means that empty shuttles can be placed in gaps between loaded shuttles or following loaded shuttles on the buffer area in order to subsequently load the empty shuttles with containers using the branching conveyor belts, to line them up in the product flow of loaded shuttles and, for example, to push them forward in the buffering direction to the at least one outfeed conveyor belt.

The empty shuttles are then preferably driven upside down in the upper level to the vertical track switch and there lowered along vertically curved curve segments onto the buffer area and/or pivoted thereonto about a horizontal axis. This prevents empty shuttles form having to be integrated into the product flow already in the infeed region which, firstly, takes up buffer space and, secondly, can disrupt the process when entering the containers into storage at the infeed conveyor belt.

The vertical track switches comprise, in particular, horizontally pivotable rail segments and/or rail segments that can be displaced transverse to the buffering direction. By integrating such rail segments, for example, curve segments and straight segments, a return circuit for empty shuttles can be closed in a selective manner at different longitudinal sections of the buffer area, for example, in order to remove empty shuttles from the buffer area and/or place them thereonto.

The row pushers preferably pick up the single-row groups of containers (rows of containers) on two sides between anterior row guides that are leading in the buffering direction and posterior row guides that are trailing in this respect. The row pushers then hold guide channels for the containers/groups of containers running transverse to the buffering direction, which are each defined by the anterior and posterior row guides. As a result, the containers can be moved comparatively quickly, precisely, and largely secured against falling over when accelerating and moving the containers in the buffering direction as well as when decelerating the containers on the buffer area.

The device described is used, in particular, for buffering containers grouped in a single row without back pressure, in particular bottles, in a container treatment system, in particular a filling system, and comprises an infeed region, an outfeed region, a buffer area and a transport system arranged above the buffer area for moving the containers on the buffer area in a buffering direction from the infeed region, which has at least one infeed conveyor belt running transverse to the buffering direction, to an outfeed region which has at least one outfeed conveyor belt running transverse to the buffering direction. The transport system comprises shuttles that are guided on rails and are driven independently of one another, with row pushers aligned to be transverse to the buffering direction for moving the containers grouped in single rows, i.e. while maintaining a spatial separation of the groups of single rows from one another.

According to the invention, the device furthermore comprises branching conveyor belts integrated into the buffer area which run transverse to the buffering direction and are driven independently of the infeed conveyor belt and outfeed conveyor belt for removing containers from storage from the buffer area in a single row and/or for entering them into storage in a single row thereon.

The advantages described in relation to claim 1 can thus be achieved.

The transport system preferably furthermore comprises an empty shuttle buffer and a connectable vertical track switch, in particular each arranged above the buffer area, with which emptied shuttles can be guided during the removal from storage on at least one of the branching conveyor belts for intermediate storage from the buffer area to the empty shuttle buffer.

The empty shuttle buffer is then preferably arranged in the upper level/tier described above. The connectable vertical track switch then preferably comprises vertically running curve segments as part of the rails and/or pivoting mechanisms for the shuttles that can be pivoted about horizontal axes, in order to guide them from the lower level/tier of the buffer area to the upper level/tier and thus connect to the empty shuttle buffer.

The transport system preferably furthermore comprises an empty shuttle buffer and a connectable vertical track switch, in particular each arranged above the buffer area, with which shuttles to be loaded can be guided during the entry into storage on at least one of the branching conveyor belts from the empty shuttle buffer to the buffer area.

In this case as well, the empty shuttle buffer is preferably arranged in the above-described upper level/tier above the lower level/tier of the buffer area and is connected to the buffer area by way of vertical track switches comprising correspondingly curved curve sections and/or pivot mechanisms.

By optionally connecting the lower and upper level/tier by way of connectable vertical track switches, flexibly relocatable circulation paths for the shuttles can be formed in the buffering direction, while including the buffer area and the empty shuttle buffer.

The device preferably furthermore comprises a bypass conveyor belt which branches off by way of a horizontal track switch from the start/inlet of the infeed conveyor belt and establishes a connection for at least partial transport of the containers to the start/inlet of the outfeed conveyor belt. The bypass conveyor belt then preferably runs substantially in the same plane as the buffer area, i.e. laterally adjacent to the buffer area and/or around it.

This would make it possible, for example, to continue system operations or the product flow in the event of a disruption in the region of the buffer area, or simply to direct excess containers or a certain buffer reserve of containers to the buffer area for the production process and to buffer them there. As a result, the utilization and wear and tear of the device could be reduced overall.

The row pushers for guiding the containers in a single row on two sides each preferably comprise a respective anterior row guide that is leading them in the buffering direction and a posterior row guide that is trailing the containers. The anterior and posterior row guides then each define a guide channel for the containers which is aligned to be transverse to the buffering direction. In this way, the containers are reliably guided in the guide channels/row pushers to prevent them from falling over, both when accelerating and being pushed forward in the buffering direction as well as when decelerating in this regard.

The row pushers/guide channels are preferably arranged in pairs on the shuttles. This enables a particularly effective utilization of the buffer area by substantially uninterrupted advancement of the shuttles without gaps and at the same time a reduction in the equipment required for the drives of the shuttles/row pushers.

The device described is preferably part of a container treatment system, for example, a filling system or picking system, which furthermore comprises a labeler, an inspection machine, and/or further a buffer device connected to at least two of the branching conveyor belts for the containers entered into storage and removed from storage by way of the branching conveyor belts. This makes it possible to provide particularly space-saving filling systems that can be flexibly adapted to different production conditions.

The container treatment system, for example, a filling system or a picking system, then preferably furthermore comprises a treatment machine for the containers that is connected upstream of the infeed conveyor belt, where the treatment machine is a blow-molding machine, filler/capper or labeler, and a packaging machine and/or storage unit for the containers that is connected downstream of the outfeed conveyor belt. As a result, the device described can be used as a central link for buffering and distributing containers between the upstream production and/or treatment of the containers and the downstream intermediate storage, packaging and/or picking. This results in a particularly space-saving and flexible production operation in the filling system.

The device described is preferably part of a container treatment system, for example, a filling system or picking system, with a remaining containers station connected to at least one of the branching conveyor belts and/or formed by the branching conveyor belts for receiving containers in excess downstream of the device. In the event of a change of type/change of format, they can be selectively removed from storage from a row pusher that is, for example, not loaded according to type, in order to maintain a substantially uninterrupted flow of containers on the infeed side and thus prevent production interruptions.

BRIEF DESCRIPTION OF THE FIGURES

Preferred embodiments of the invention shall be illustrated by way of drawings, where.

DETAILED DESCRIPTION

Figure 1:
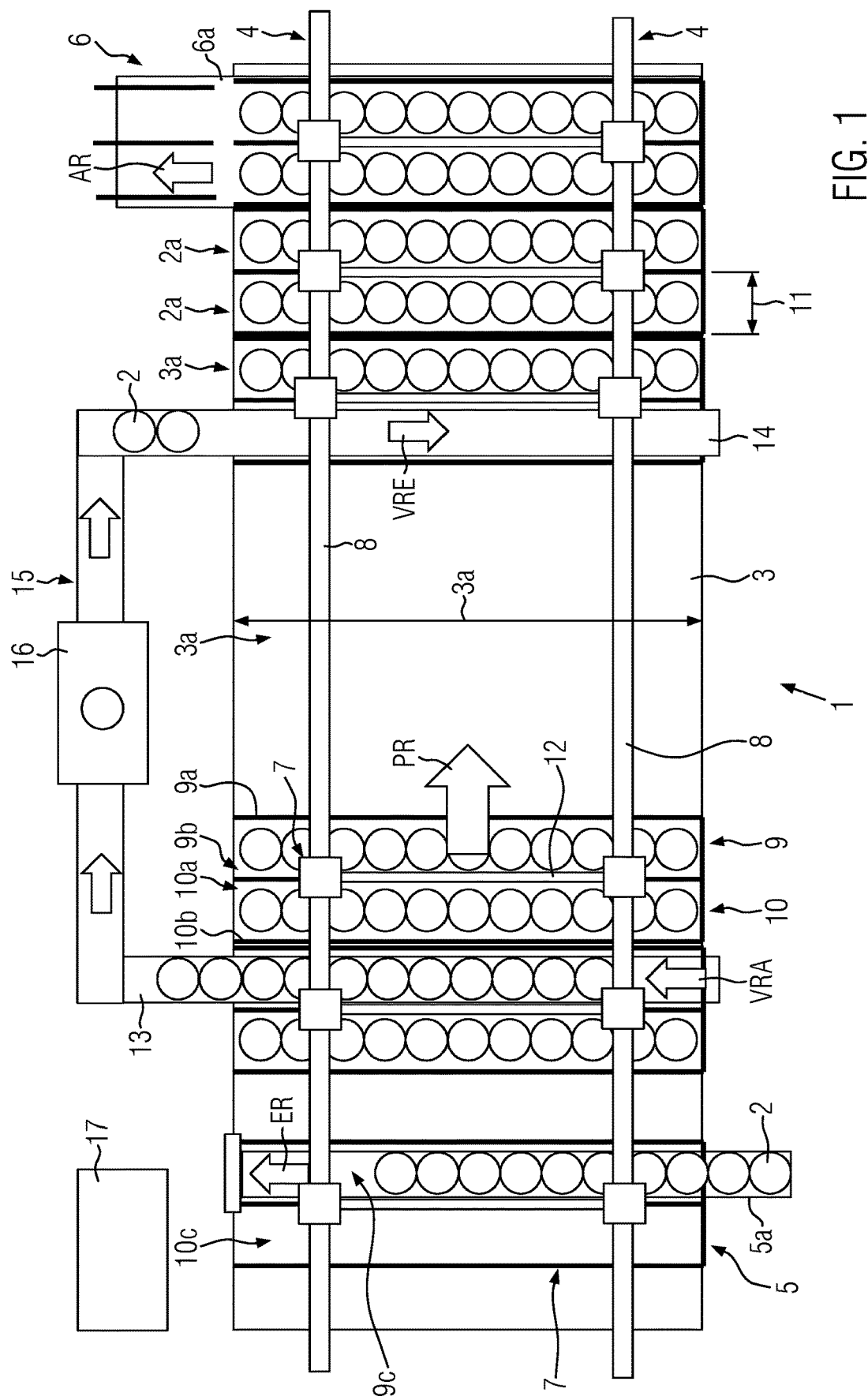
FIG. 1 shows a schematic plan view onto the buffer area of the device with the lower level/tier of the transport system.
Figure 2:
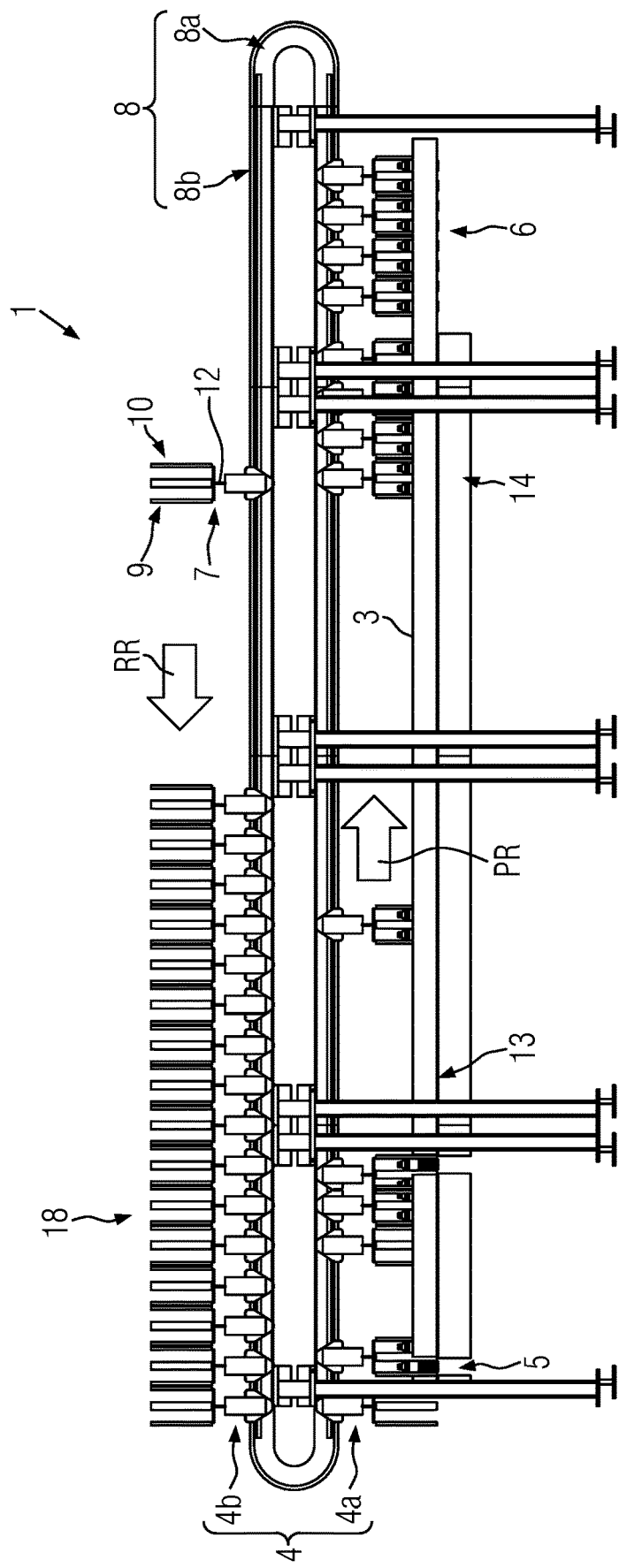
FIG. 2 shows a schematic side view of the device.

As can be seen from FIGS. 1 and 2, device 1 for buffering containers 2 while maintaining a spatial separation between single-row groups of containers 2a comprises a substantially horizontal buffer area 3 and a transport system 4 arranged thereabove for moving containers 2/groups of containers (rows of containers) 2a on buffering area 3 in a buffering direction PR. This can also be understood as moving spatially separate buffer lanes for containers 2. Containers 2 are, for example, bottles.

Device 1 furthermore comprises an infeed region 5 with at least one infeed conveyor belt 5a and an outfeed region 6 with at least one outfeed conveyor belt 6a. Infeed region 5, buffer area 3, and outfeed region 6 form a substantially flat transfer region for containers 2/groups of containers (rows of containers) 2a At least one infeed conveyor belt 5a runs in an infeed direction ER and outfeed conveyor belt 6a in an outfeed direction AR, each transverse and in particular orthogonal to buffering direction PR of transport system 4.

Several outfeed conveyor belts 6a can be arranged adjacent to one another in buffering direction PR and each associated with a transport aisle 6b adjoining in outfeed direction AR.

Transport system 4 comprises independently driven shuttles 7 and rails 8 configured as a closed circulation path along which shuttles 7 run.

Shuttles 7 preferably comprise at least one row pusher 9 being anterior (viewed in buffering direction PR) and a row pusher 10 being posterior in this regard. Shuttles 7, however, could also each comprise only one of row pushers 9, 10.

Row pushers 9,10 arranged consecutively in buffering direction PR on respective shuttle 7 can also be viewed as twin row pushers. Each row pusher 9, 10 is configured to receive containers 2/groups of containers 2a in a single row and is oriented to be transverse, in particular orthogonal, to buffering direction PR.

The single row reception of containers 2/groups of containers 2a in row pushers 9, 10 enables zero back pressure advancement in buffering direction PR, i.e. substantially without mutual back pressure between groups of containers 2a that are adjacent in buffering direction PR and are then always spatially separate from one another.

Row pushers 9, 10 are configured for the respective leading and trailing guidance of containers 2 grouped in a single row and therefore for their guidance both in buffering direction PR, i.e. when they are advanced in buffering direction PR, for example, when accelerating the advancement, as well as opposite to buffering direction PR, in particular when decelerating the advancement.

Row pushers 9, 10 for this purpose each comprise an anterior row guide 9a, 10a leading containers 2 and a posterior row guide 9b, 10b trailing containers 2, as well as guide channels 9c, 10c defined by the former for receiving and guiding containers 2/individual groups of containers (rows of containers) 2a on both sides.

Row pushers 9, 10 or their guide channels 9c, 10c, respectively, each have a clear width 11 defined between anterior row guide 9a, 10a and posterior row guide 9b, 10b which can preferably be adapted to the respective container width/the respective container diameter, for example, by way of an adjusting mechanism 12 indicated only schematically.

Adjusting mechanism 12 can be actuated, for example, by way of a stationary adjusting station (not shown) arranged in the region of transport system 4 or also manually. To actuate actuating mechanism 12, non-loaded shuttles 7/empty shuttles can be stopped temporarily when returning.

Row pushers 9, 10 preferably extend substantially over entire width 3a of buffer area 3 and preferably have a width (transverse to buffering direction PR) of 3 to 6 m, in particular of 4 to 5.5 m.

Transport system 4 comprises a lower level 4a in which shuttles 7 are guided with downward-facing row pushers 9, 10 over buffer area 3 in buffering direction PR, and an upper level 4b in which empty shuttles 7, i.e. in an unloaded state, with row pushers 9, 10 facing upwards, i.e. upside down, run along rails 8 in a return direction RR opposite to buffering direction PR.

Rails 8 comprise vertically curved curve segments 8a which are preferably configured as clothoids, as well as straight segments 8b.

As can also be seen in FIG. 1, branching conveyor belts 13, 14 are integrated into buffer area 3 and, like at least one infeed conveyor belt 5a/outfeed conveyor belt 6a, are arranged to be transverse and in particular to be orthogonal to buffering direction PR and are driven separately therefrom, and possibly in a branching direction VRA for removing containers from storage from buffer area 3 and a branching direction VRE (that is opposite by way of example in FIG. 2) for entering containers 2 into storage on buffer area 3.

Branching conveyor belts 13, 14 are therefore used substantially for entering or removing into and from storage any number of containers 2 in rows (in lanes) to be buffered or already buffered in respective row pushers 9, 10.

In principle, branching conveyor belts 13, 14 could also be driven bidirectionally, i.e. with a reversible branching direction VRA/VRE for selectively entering or removing containers 2/rows of containers 2a into or from storage, as shall be described in detail with reference to FIG. 10.

FIG. 1 shows by way of example a branching conveyor belt 13 that is posterior (seen in buffering direction PR) for removing containers 2 from storage from buffer area 3 and a branching conveyor belt 14 that is anterior (seen in buffering direction PR) for entering containers 2 into storage onto buffer area 3.

Posterior branching conveyor belt 13 can be driven, for example, in the outfeed direction AR and anterior branching conveyor belt 14 in the opposite direction so that a bypass section 15 can be formed around a partial region of buffer area 3 with a connecting conveyor belt connected between the former. For example, a unit 16 for treating and/or inspecting specific containers 2 can be integrated into bypass section 15.

Branching conveyor belts 13, 14 are driven independently of at least one infeed conveyor belt 5a and at least one outfeed conveyor belt 6a and can be driven or stopped, for example, in a selective manner by way of a (schematically indicated) control device 17 of device 1 for entering/removing containers 2 into and from storage.

Device 1 is preferably operated such that shuttles 7 for entering and removing containers 2 into and from storage are substantially standing still above infeed conveyor belt 5a, outfeed conveyor belt 6a, or branching conveyor belt 13, 14 respectively provided for this purpose, so that, when row pusher 9, 10 is at rest, containers 2 can run into respective guide channel 9c, 10c or run out of respective guide channel 9c, 10c respectively.

Before and after entry/removal of containers 2 into and from storage, shuttles 7 can be moved independently of one another and at a suitable speed through non-loaded buffer regions 3a of buffer area 3 and/or advance step by step in loaded buffer regions 3b of buffer area 3 due to their individual drives.

For this purpose, shuttles 7 are driven, for example, by way of a linear motor drive or coupled transport chains (neither shown), so that individual shuttles 7 can be moved through the individual regions of lower level 4a and upper level 4b of transport system 4 at respective suitably adapted speeds.

In other words, individual shuttles 7 can in principle be moved to any points on the circulation path defined by rails 8 and positioned there, and for this purpose they can be accelerated and decelerated independently of one another. Firstly, the distances between individual shuttles 7 can thus be changed, for example, to traverse empty buffer regions 3*a*, secondly, a sequence of several shuttles 7 can be moved with a uniform spacing from one another, in particular when shuttles 7 move up to a filled buffer region 3*a* toward outfeed region 6.

Shuttles 7 can be configured, for example, as runners of linear motors, the active components of which are preferably arranged on rails 8 and are then equipped, for example, with associated permanent magnets. As is known, they then interact with long stators as individual drives for individual shuttles 7.

However, other drives are also conceivable, for example, servomotors (not shown) formed on shuttles 7 with drive pinions which can run along a toothed ring (not shown) formed along rails 8. Shuttles 7 then comprise, for example, guide rollers 7*b* or the like which interact with rails 8.

For this purpose, drive energy can be transmitted to the servomotors or similar drives of shuttles 7, for example, in a contactless manner, i.e. without conductor lines.

The Shuttles can also comprise energy storages for their individual drives, such as power capacitors, batteries or the like. In this way, peaks in the power consumption can be compensated for, for example, when accelerating shuttles 7, or an energy supply can be maintained in sections of the rails in which no permanent energy feed from a stationary energy source is possible.

To control individual shuttles 7, for example, data transmission is possible by way of leakage waveguides and/or in a radio-supported manner, for example, by way of wireless LAN.

Such drive concepts and control concepts for shuttles 7 are basically known and are therefore not explained in more detail.

As can also be seen in FIG. 2, transport system 4 comprises an empty shuttle buffer 18 in its upper level 4*b* in which non-loaded shuttles 7 wait for containers 2 to be entered into storage in lower level 4*a* of transport system 4.

In FIG. 2, empty shuttle buffer 18 extends overall between curve segments 8*a* of rails 8 on the infeed side or on the outfeed side. Curve segments 8*a* are immovable and (when viewed in buffering direction PR) are each arranged outside infeed region 5 and outfeed region 6. All shuttles 7 in lower level 4*a* therefore necessarily pass through infeed region 5, buffer area 3, and outfeed region 6.

This means that shuttles 7 in the configuration shown in FIG. 2 that are completely emptied are moved at posterior branching conveyor belt 13 onward in buffering direction PR over buffer area 3 and could then be loaded again with containers 2, for example, at anterior branching conveyor belt 14. It would also be conceivable to enter and/or remove only individual containers 2 into/from storage from shuttles 7 at branching conveyor belts 13, 14.

However, it is also conceivable that shuttles 7 emptied at posterior branching conveyor belt 13 are not again loaded in the region of buffer area 3 so that empty shuttles 7 then need to travel up to outfeed region 6 subsequent to and/or between loaded shuttles 7. Firstly, this consumes buffer area 3 and, secondly, can impede the process when removing containers 2 from storage in outfeed region 6.

It could also be necessary, for example, to enter containers 2 into storage on buffer area 3 at anterior branching conveyor belt 14, although there is currently no empty or sufficiently receptive shuttle 7 on buffer area 3 available for this purpose. In this case one would have to wait until an empty/sufficiently receptive shuttle 7 has moved through infeed region 5 up to anterior branching conveyor belt 14. Buffer area 3 is again required also for this. Furthermore, this could impede the process when entering containers 2 into storage in infeed region 5.

For this reason, it can be advantageous to arrange at least one vertical track switch 19 above buffer area 3 which can optionally connect lower level 4*a* of transport system 4 to upper level 4*b* between infeed region 5 and outfeed region 6.

Figure 3:
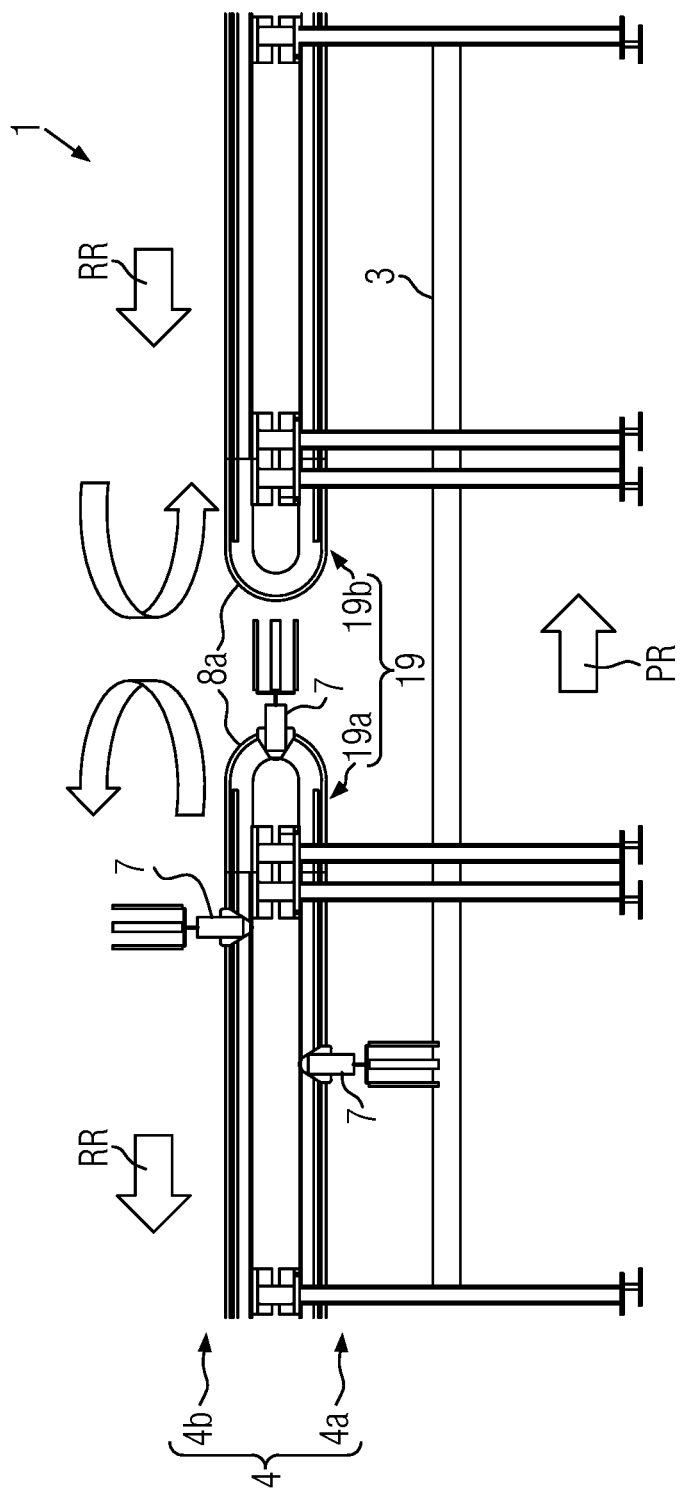
FIG. 3 shows a side view of a vertical track switch for empty shuttles that is integrated into the transport system.
Figure 4A:
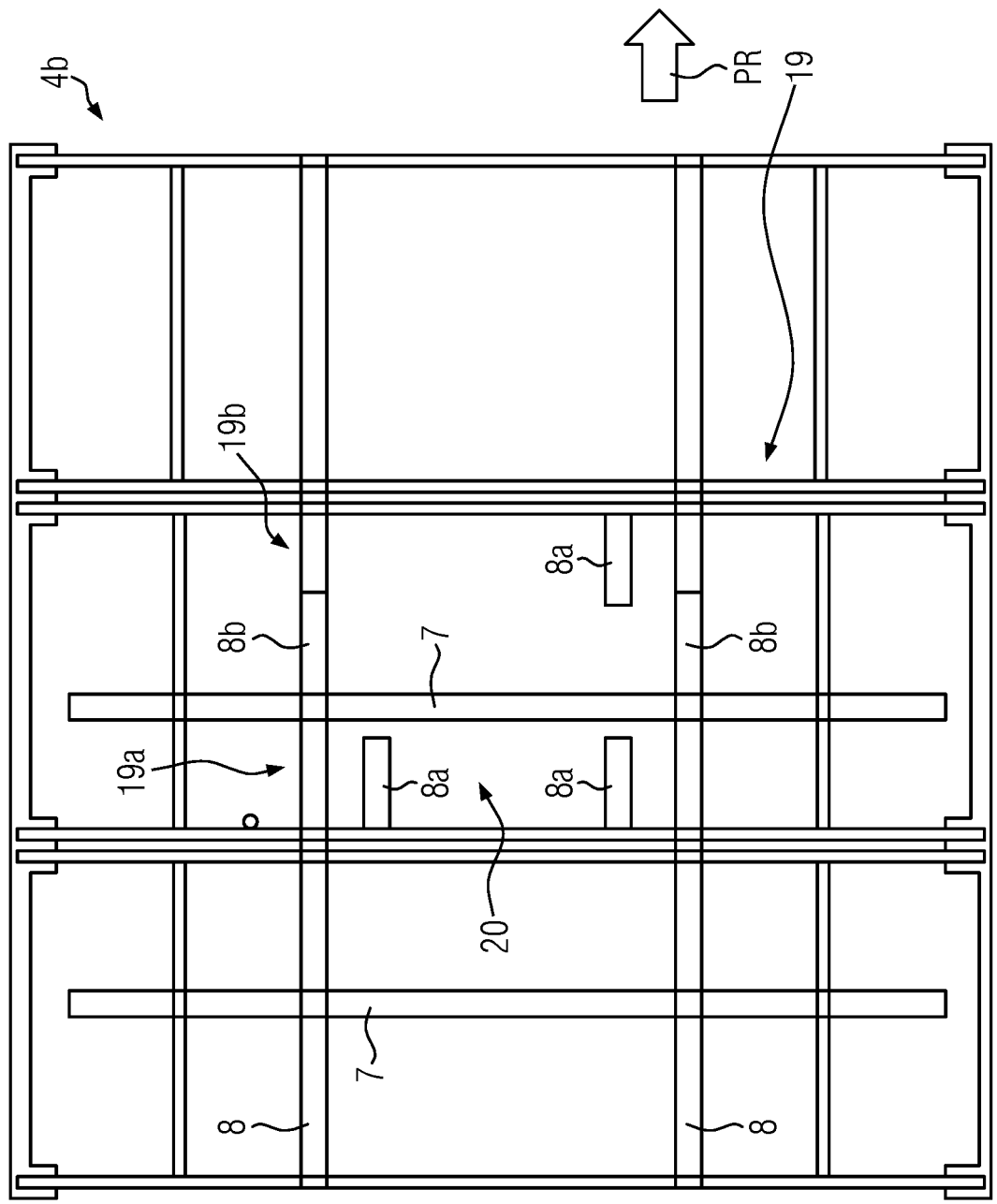
FIGS. 4A-4D show a plan view onto the vertical track switch in different positions.
Figure 4B:
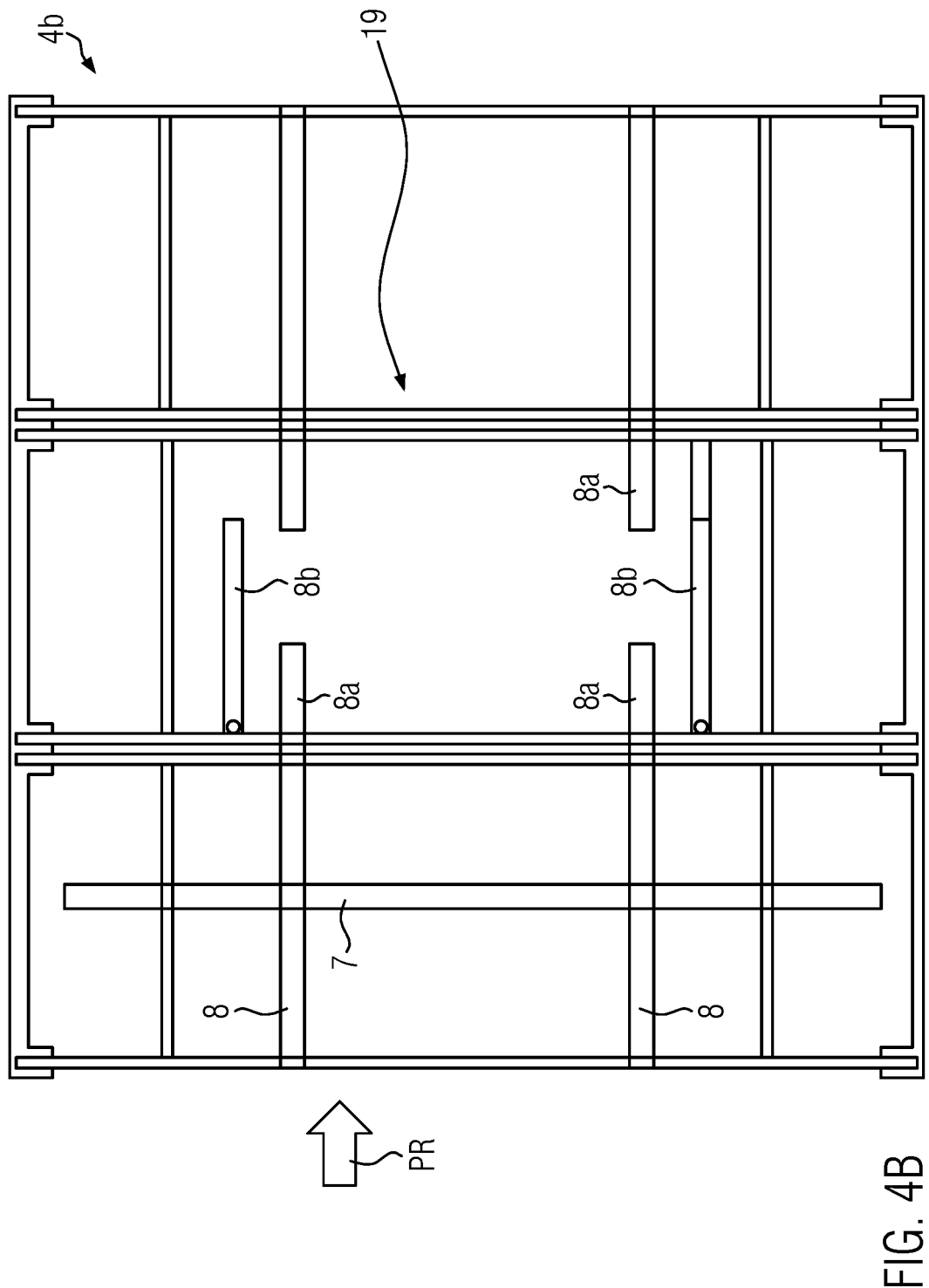
Figure 4C:
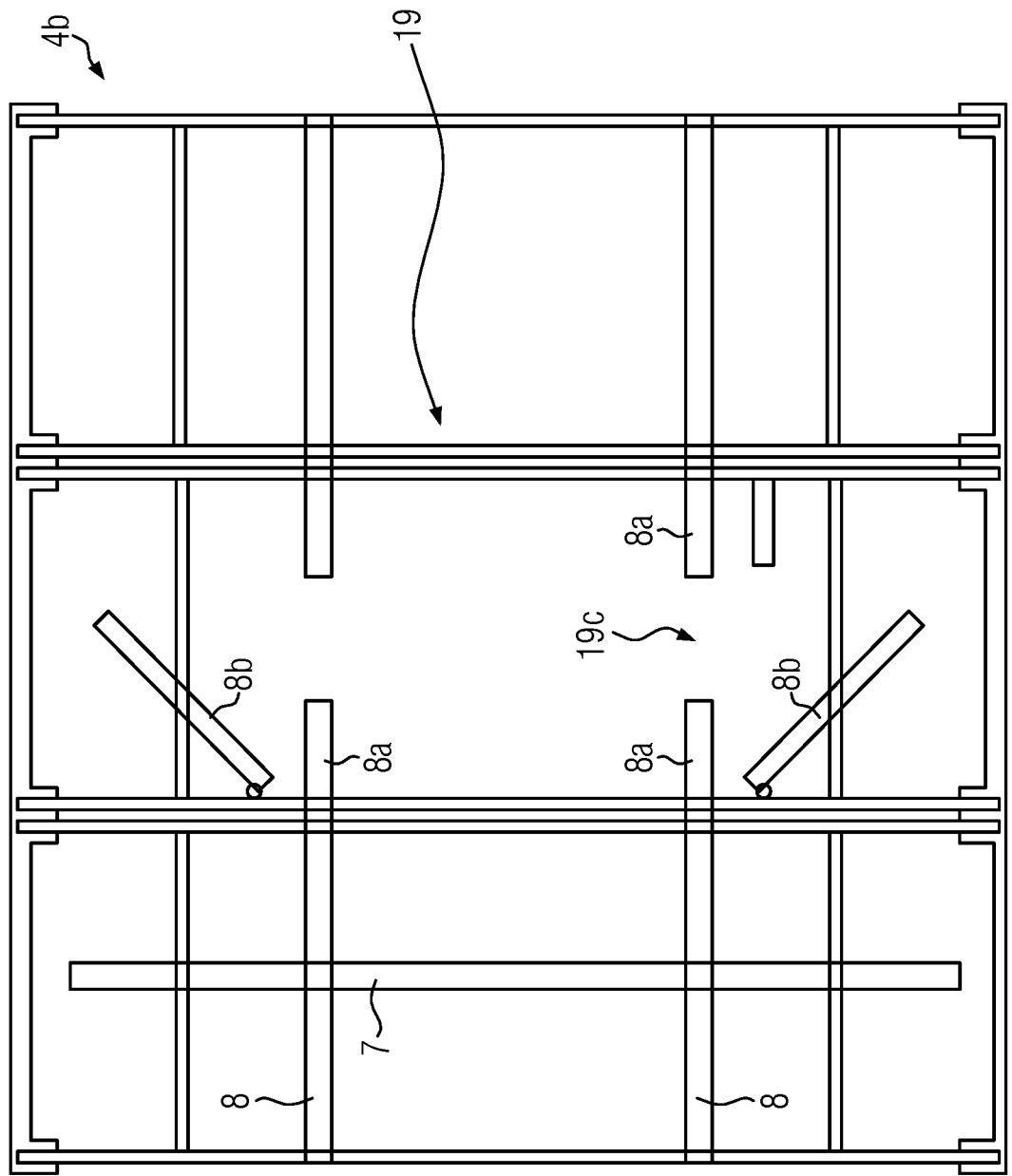
Figure 4D:
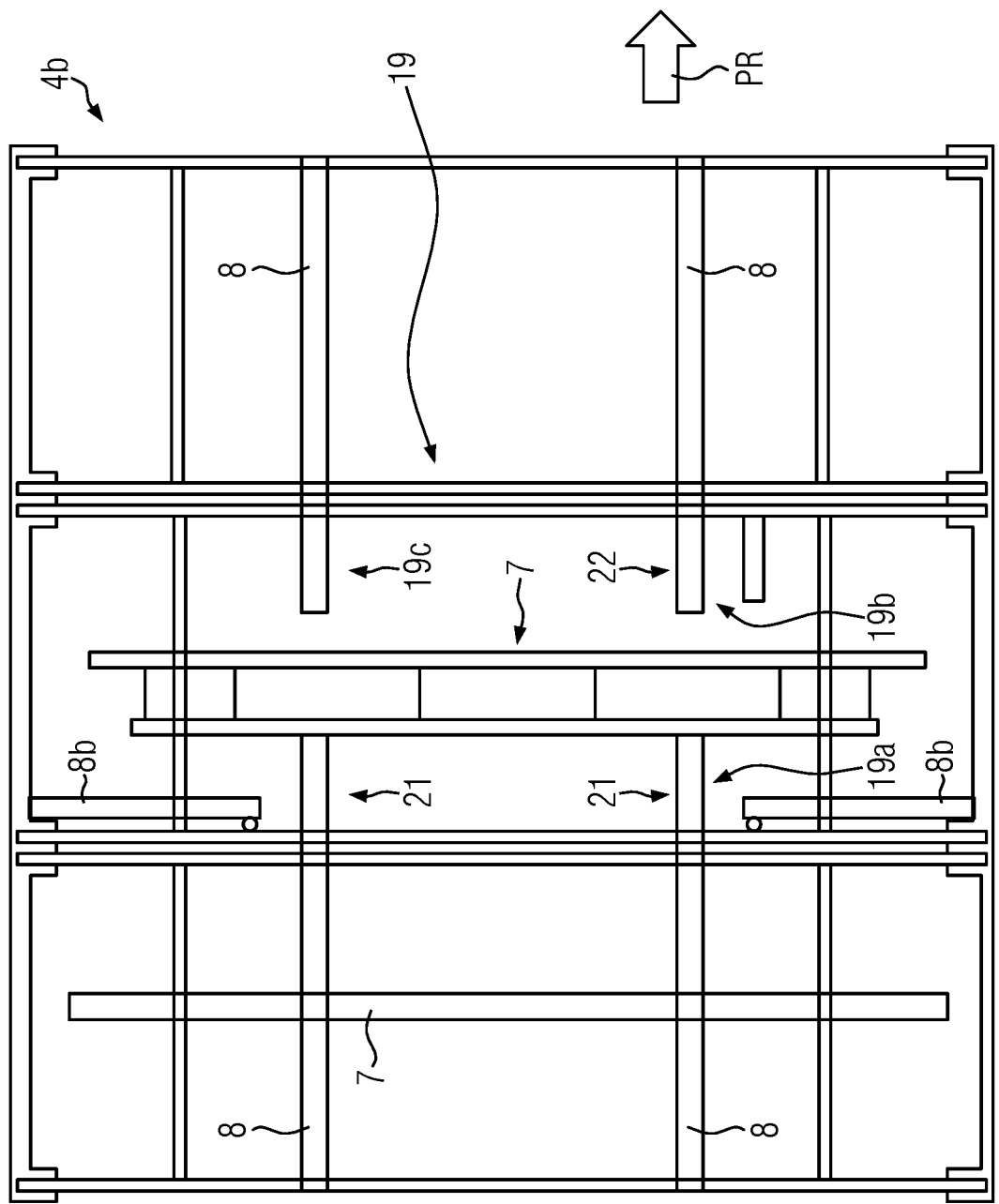

Such a vertical track switch 19 is illustrated by way of example in FIG. 3 and in FIGS. 4A-4D, where FIG. 4D shows the same state as FIG. 3.

According to FIG. 3, vertical track switch 19 comprises a lead-out section 19*a* with which empty shuttles 7 can be led out from lower level 4*a* to upper level 4*b* and thereby to empty shuttle buffer 18, as well as a lead-in section 19*b* with which empty shuttles 7 can be led out from upper level 4*b* of transport system 4, i.e. from empty shuttle buffer 18, into lower level 4*a* and thereby into the region of buffer area 3.

For this purpose, vertical track switch 19 preferably comprises movable curve segments 8*a* which can be inserted into rails 8 instead of movable straight segments 8*b*. Movable straight segments 8*b* can be, for example, shifted and pivoted horizontally and transverse to buffering direction PR and can thus be detached from rail 8. Instead of movable straight segments 8*b*, movable curve segments 8*a* are then inserted into curve 8. This is shown by way of example in FIGS. 4A to 4D in a plan view onto upper level 4*b* of transport system 4.

FIG. 4A shows an inactive position 20 of vertical track switch 19 in which its movable straight segments 8*b* are integrated into rails 8 both in lower level 4*a* as well as in upper level 4*b* so that shuttles 7 running in lower level 4*a* pass vertical track switch 19 from its lead-in section 19*a* on the inlet side to its lead-out section 19*b* on the outlet side without impairment and therefore continue to run in lower level 4*a*.

FIG. 4A indicates merely for the sake of illustration that vertical track switch 19 does not necessarily have to comprise a lead-out section 19*a* and a lead-in section 19*b*. This means that vertical track switch 19 could be configured only as a lead-out track switch for empty shuttles 7, only as a lead-in track switch for empty shuttles 7, or as a combination track switch for alternately leading empty shuttles 7 in or out.

Vertical track switch 19 in FIG. 4A is therefore shown on rail 8 (when viewed in buffering direction PR) on the right-hand side (at the bottom in FIG. 4A) as a combination track switch and on the rail (when viewed in buffering direction PR) on the left-hand side (at the top in FIG. 4A) only as a lead-out track switch. Consequently, vertical track switch 19 shown on rail 8 on the right-hand side comprises two movable curve segments 8*a* offset transverse to buffering direction PR, namely one for leading out and one for leading in empty shuttles 7, where rail 8 on the left-hand side comprises only a single movable curve segment 8*a*, namely for leading empty shuttles 7 out.

In practice, however, the movable rail segments of vertical track switch 19 are configured in the same way on all rails 8, i.e. either as a combination track switch, only as a lead-out track switch or only as a lead-in track switch.

The movable curve segments 8*a* in FIG. 4A are each arranged in an inactive waiting position which is offset relative to rails 8 transverse to buffering direction PR.

The movable straight segments 8b in FIG. 4A are integrated into the circulation path formed by rails 8 for shuttles 7 so that vertical track switch 19 is in an inactive position 20 in which it does not establish any connection between levels 4a, 4b.

FIG. 4B shows a state when switching over vertical track switch 19 from inactive position 20 to a lead-out position 21 and to a lead-in position 22 (each in FIG. 4D). For this purpose, movable straight segments 8b are pushed preferably outwardly transverse to buffering direction PR and movable curve segments 8a are pushed in in their place from the inside until they are flush with rails 8.

This takes place both at the infeed side as well as at the outfeed side, only at the infeed side, or only at the outfeed side, depending on the configuration of vertical track switch 19.

In the state shown in FIG. 4B, transport system 4 is already divided into a circulation path for shuttles 7 (in buffering direction PR) upstream of vertical track switch 19 and a circulation path downstream of vertical track switch 19.

FIG. 4C shows a state during further switching over of vertical track switch 19. Accordingly, movable straight segments 8b are additionally pivoted horizontally from a position parallel to rails 8 to a position aligned to be transverse to rails 8. This serves to guide shuttles 7 through a gap 19c of vertical track switch 19 thus formed between movable curve segments 8a so that they can run between upper and lower levels 4a, 4b of transport system 4 along movable curve segments 8a.

This process is shown by way of example in FIG. 4D for lead-out position 21 (at the top) and lead-out position 21 and lead-in position 22 (at the bottom). Accordingly, an empty shuttle 7 moves at lead-in section 19a of vertical track switch 19 at the inlet side from lower level 4a to upper level 4b of transport system 4 along associated movable curve segments 8a. This snapshot is also illustrated in FIG. 3 in a side view.

If vertical track switch 19 is configured as a combination track switch both for leading empty shuttles 7 out and in, then this is only possible alternately in the configuration shown in FIGS. 3 and 4A to 4D. This means that gap 19c formed between lead-out region 19a and lead-in region 19b is sized such that shuttles 7 can only travel through gap 19c in one direction. This minimizes the dimensions of vertical track switch 19 in buffering direction PR.

If necessary, several vertical track switches 19 can be integrated into transport system 4 above buffer area 3. Such vertical track switches 19 can be configured as a combination track switch, an exclusive lead-out track switch, and/or an exclusively lead-in track switch and can be flexibly integrated into transport system 4 as modules.

For changing over vertical track switch 19 between its inactive position 20 and lead-out position 21/lead-in position 22, movable curve segments 8a and movable straight segments 8b of vertical track switch 19 are preferably attached onto linear units and are correspondingly controlled and moved by the latter. Pivoting units are then furthermore provided for movable straight segments 8b and can be driven, for example, by associated servomotors. Suitable embodiments for associated linear units and servomotors are known in principle and are therefore not identified in the figures.

Movable curve segments 8a or straight segments 8b used, respectively, are preferably mechanically pegged to the adjoining sections of rails 8 in order to stabilize their flush connection and to support straight segments 8b on both respective sides.

Moving movable curve segments 8a and straight segments 8b and pivoting straight segments 8b can take place, for example, by way of counter-rotating rocker arms and/or electric cylinders. The movement can optionally also be effected by way of toothed belt drives or the like.

Vertical track switch 19 makes it possible to relocate empty shuttles 7 vertically, i.e. between different levels 4a, 4b of transport system 4, and thereby to lead them out and/or in in a selective manner in the region of branching conveyor belts 13, 14.

In principle, this would also be possible with more than two tiers/levels 4a, 4b of transport system 4 arranged one above the other (not shown).

The tier-like arrangement of different levels 4a, 4b of transport system 4 one above the other reduces the area space required for buffering empty shuttles 7 and enables particularly efficient operation for leading them into/out of buffer area 3 with at least one vertical track switch 19.

Vertical track switches 19 allow empty shuttles 7 to be led in/led out without transverse transport of shuttles 7 with respect to buffering direction PR. The undercarriages of shuttles 7 can therefore be aligned rigidly, that is to say they do not have to be rotatable horizontally, which reduces the design complexity and the dimensions.

Compared to known horizontal track switches, vertical track switch 19 enable a space-saving arrangement of empty shuttle buffer 18 and simplified chassis and drives of shuttles 7. While horizontal track switches with a large track width typically require shuttles with rotating chassis and separate drives for the right-hand and the left-hand rails, shuttles 7 of device 1 only have a single drive motor (not shown) which is then connected to the chassis (not shown) for the right-hand and left-hand rails 8, for example, by way of drive shafts.

Figure 5:
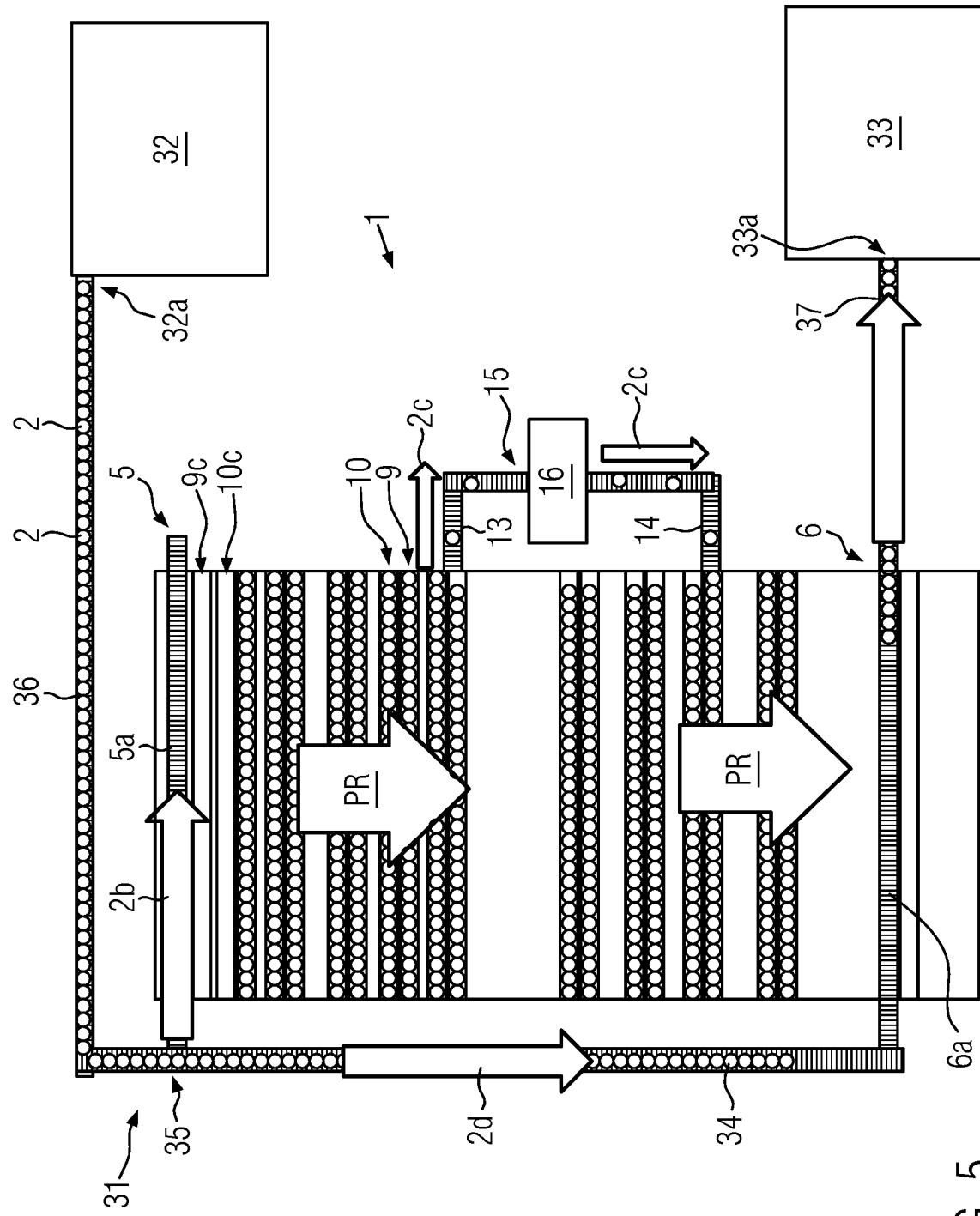
FIG. 5 shows a schematic top view onto a first integration of the device into a filling system.

FIG. 5 shows schematically a first filling system 31 with device 1, with a first treatment machine 32, with a second treatment machine 33, and with a bypass conveyor belt 34 between infeed region 5 and outfeed region 6 of device 1.

Filling system 31 furthermore comprises a horizontal track switch 35 which can connect a first conveyor belt 36 adjoining outlet 32a of first treatment machine 32 either to infeed conveyor belt 5a of device 1 or also to bypass conveyor belt 34. Outfeed conveyor belt 6a of device 1 is connected via a second conveyor belt 37 to inlet 33a of second treatment machine 33.

It can also be seen that device 1 comprises a posterior branching conveyor belt 13 for removing containers 2 from storage as well as an anterior branching conveyor belt 14 for entering containers 2 into storage back onto buffer area 3 that were removed from storage with posterior branching conveyor belt 13. Branching conveyor belts 13, 14 are connected to each other by a bypass route 15 with an inspection unit 16. Individual containers 2 can be, for example, inspected at random in inspection unit 16, where the entry and removal of containers 2 that are to be inspected or have been inspected is possible flexibly via branching conveyor belts 13, 14 into guide channels 9c, 10c of row pushers 9, 10 or out of them is possible, respectively.

For example, a comparatively small portion 2c of a portion 2b of containers 2 supplied from infeed region 5 of device 1 that were fed from first treatment machine 32 can be removed from storage buffer area 3 for carrying out comparatively time-consuming offline inspections, such as optical measurements, laboratory tests, and/or visual random examinations. Depending on the type of inspection/sampling, portion 2c of containers 2 can then be entered again into storage on buffer area 3, possibly also to a reduced extent. Entry into storage and removal from storage can there take place in following the first-in first-out principle.

A portion 2d of containers 2 arriving from first treatment machine 32 can be guided via bypass conveyor belt 34 to second treatment machine 33 without including infeed region 5 and buffer area 3 of device 1.

This can be advantageous, for example, if the storage operation on buffer area 3 is disrupted and/or if only a certain portion 2b of containers 2 arriving from first treatment machine 32 in the sense of a container surplus or a safety reserve is to be routed over buffer area 3. This would also be conceivable during regular production operations for minimizing the utilization and wear and tear of device 1.

First treatment machine 32 could be, for example, a labeler and second treatment machine 33 could be, for example, a packaging machine. It would also be possible for first treatment machine 32 to be a filler/capper and second treatment machine 33 to be a labeler. Treatment machine 32 can also comprise a combination of a blow-molding machine, a labeler, and a filler with a subsequent capper.

Depending on the compliance with a first-in-first-out principle that may be required, the container inlets, for example, to infeed region 5, and the container outlets, for example, from outfeed region 6, as well as those at branching conveyor belts 13, 14, can be provided at device 1 both on the same side of buffer area 3 or on opposite sides of buffer area 3 (in each case viewed transverse to buffering direction PR). For example, individual branching conveyor belts 13, 14 and/or bypass conveyor belts 34 as well as conveyor belts 36 upstream of device 1 and/or conveyor belts 37 downstream of device 1 can run in loops around buffer area 3. For example, the order of containers 2 can be selectively reversed by a bypass conveyor belt 34 in order to comply with a first-in-first-out principle.

Figure 6:
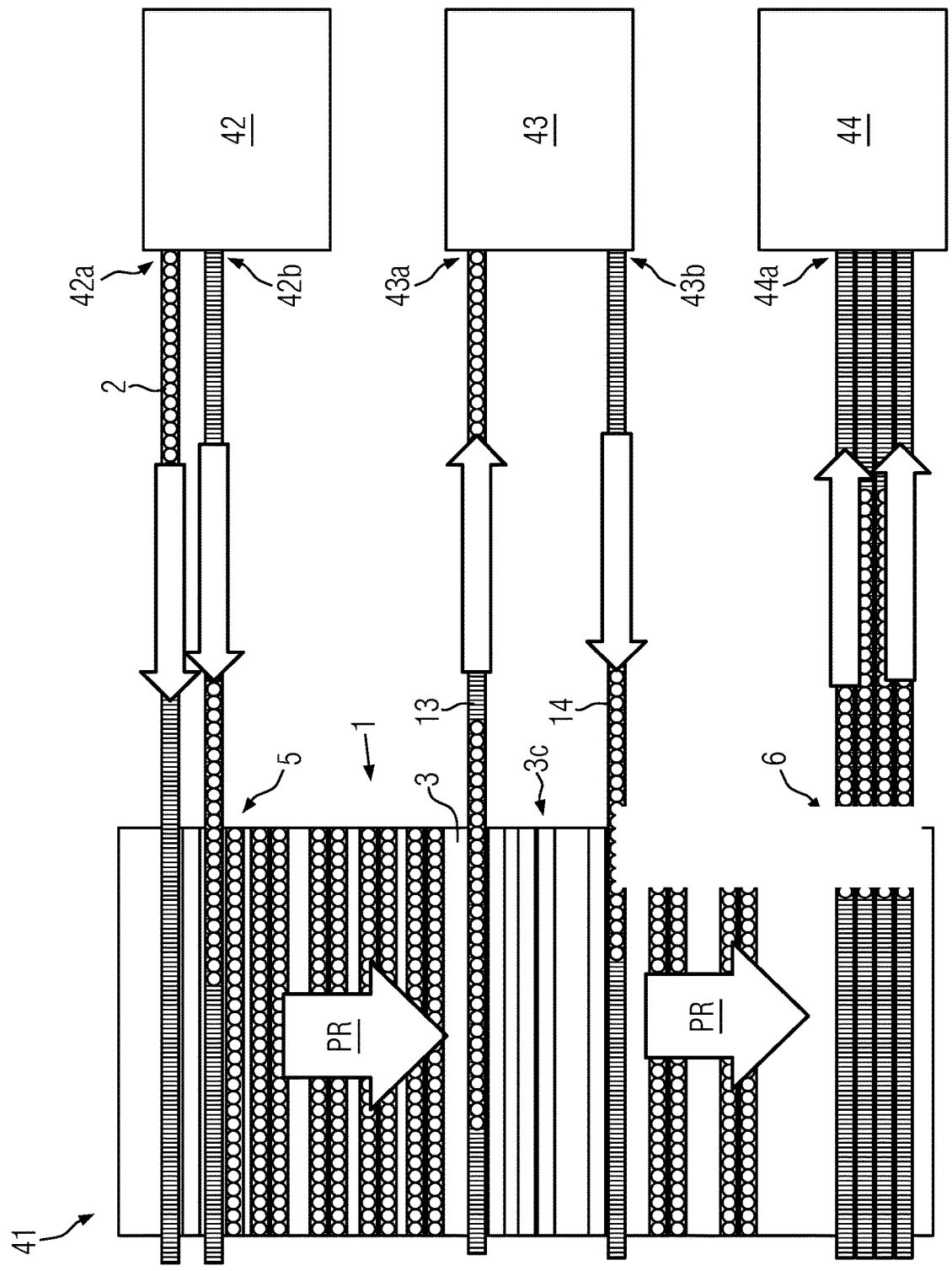
FIG. 6 shows a schematic top view onto a second integration of the device into a filling system.

FIG. 6 shows schematically a second filling system 41 with device 1, with a first treatment machine 42, with a second treatment machine 43, and with a third treatment machine 44.

Accordingly, containers 2 of different intermediate product stages, for example, immediately after filling/capping and immediately after labelling, can be buffered in device 1 at the same time and are thereby disposed on the same buffer area 3.

According to the example in FIG. 6, two outlets 42a, 42b of first treatment machine 42, which is used, for example, to fill and close containers 2, are connected to infeed region 5 of device 1. Furthermore, an inlet 43a of second treatment machine 43, which is, for example, a labeler, is connected to posterior branching conveyor belt 13 and an outlet 43b of second treatment machine 43 is connected to anterior branching conveyor belt 14. Outfeed region 6 of device 1 is connected to inlet 44a of third treatment machine 3, which is, for example, a packaging machine.

Accordingly, containers 2 can be fed from first treatment machine 1 either from both outlets 42a, 42b and therefore in two lanes to buffer area 3, but possibly also only in one lane from one of outlets 42a, 42b of first treatment machine 42.

Containers 2 are preferably removed from storage from buffer area 3 in one lane, fed to second treatment machine 43 and returned from there in one lane to buffer area 3 and entered into storage there again.

If necessary, a buffer region 3c for empty shuttles 7 can be provided on buffer area 3 between branching conveyor belts 13, 14. Vertical track switch 19 previously described could possibly also be formed between branching conveyor belts 13, 14, for example, a vertical track switch 19 for leading empty shuttles 7 out of the region of posterior branching conveyor belt 13 and a vertical track switch 19 for leading empty shuttles 7 into the region of anterior branching conveyor belt 14.

In principle, the connections between treatment machines 42, 43, 44 and device 1 can be formed to be single-lane and/or multi-lane.

It is also conceivable for first treatment machine 42 to comprises two treatment units that are independent of one another and are configured, for example, to treat different filling materials and/or container formats. For example, one treatment unit could then be connected to one outlet 42a of first treatment machine 42 and the other treatment unit to other outlet 42b. The containers would then optionally be supplied to device 1 alternately on different conveyor belts, depending on the filling material/container format.

This is also conceivable for second treatment machine 43 which can also comprise treatment units that are independent of one another, for example for applying different types of labels to containers 2 depending on the filling material and/or container format.

In principle, what was described for first and second treatment machine 42, 43 also applies to third treatment machine 44 which can comprise independent units for treating containers 2 therein either in parallel or alternately, for example, depending on the filling material and/or container format.

In principle, it would also be conceivable to arrange first and/or second and/or third treatment machine 42, 43, 44 on different sides (transverse to buffering direction PR) of buffer area 3.

Figure 7:
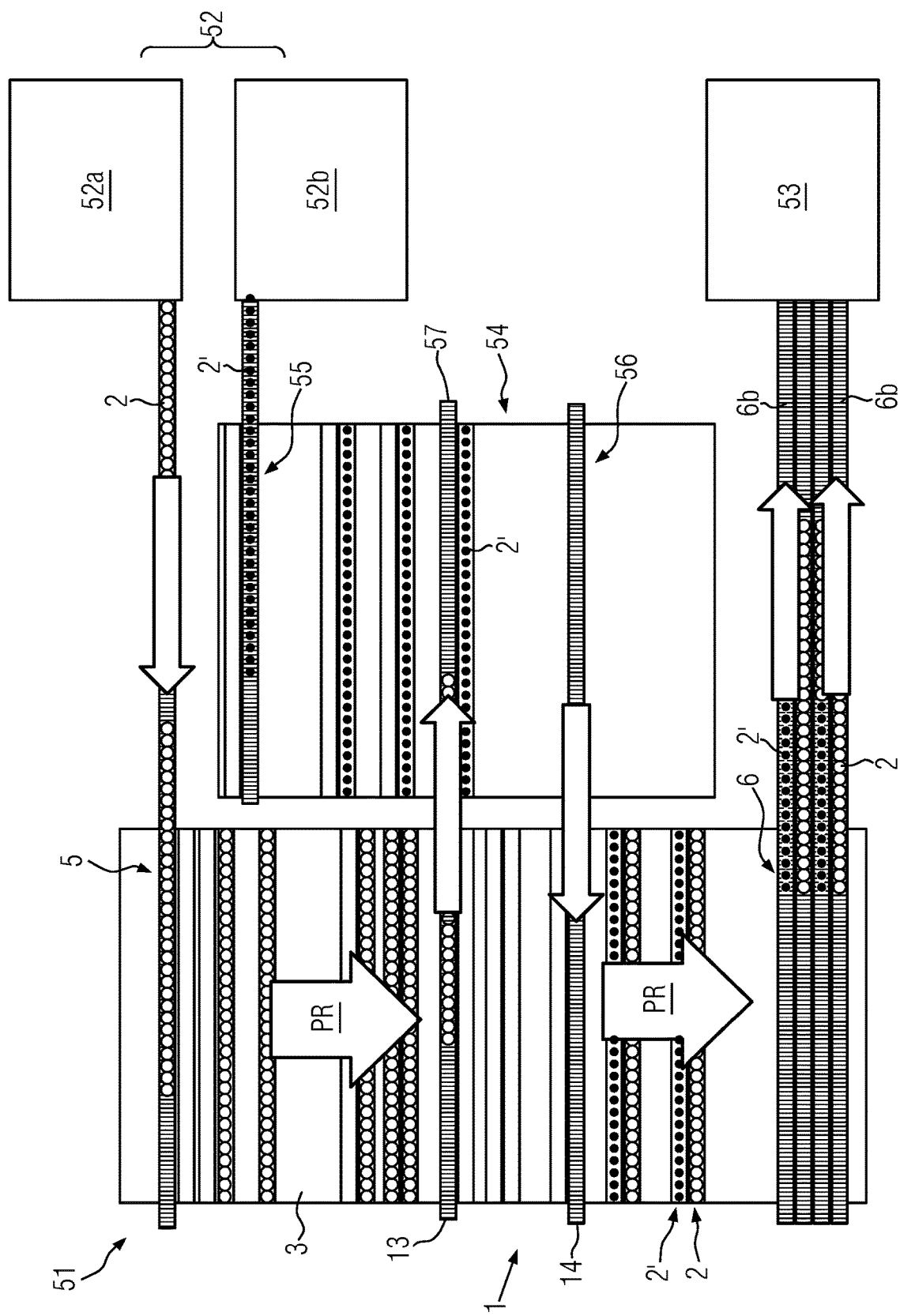
FIG. 7 shows a schematic top view onto a third integration of the device into a filling system.

FIG. 7 schematically shows a third filling system 51 with device 1, with a first treatment machine 52 comprising a first independent treatment unit 52a and a second independent treatment unit 52b, with a second treatment machine 53, and with a secondary buffer device 54 for buffering containers 2 substantially according to the same functional principle as device 1.

Secondary buffer device 54 accordingly comprises an infeed region 55, an outfeed region 56, and at least one branching conveyor belt 57 which is integrated into the buffer region of secondary buffer device 54 similarly to device 1.

Accordingly, first treatment unit 52a of first treatment machine 52 is connected on the outlet side to infeed region 5 of device 1, while second treatment unit 52b of first treatment machine 52 on the outlet side is connected to infeed region 55 of adjacent buffer device 54.

Furthermore, a posterior branching conveyor 13 of device 1 is connected or is identical to branching conveyor 57 of secondary buffer device 54 for removing containers 2 from storage from device 1 and entering them into storage in secondary buffer device 54.

Outfeed region 56 of secondary buffer device 54 is furthermore connected to an anterior branching conveyor belt 14 of device 1 or is identical for storing containers 2 out of secondary buffer device 54 and into device 1.

Outfeed region 6 of device 1 is preferably connected to second treatment machine 53 in multiple lanes.

Mutually independent treatment units 52a, 52b of first treatment machine 52 are preferably used for the same treatment step, i.e. for example, for filling and closing container 2 or labeling container 2 or filling, closing, and labeling container 2. However, treatment units 52a, 52b can also comprise a combination of the following treatment steps of forming containers 2 in a blow molding machine, label containers 2 in a labeler, fill and close containers 2 in a filler with a subsequent closing machine. However, preferably different filling materials and/or different container formats are treated in treatment units 52a, 52b.

Different container formats and/or filling materials can be buffered, i.e. stored and transported, on buffer area 3 of device 1 and on the buffer area of secondary buffer device 54.

This is shown in FIG. 7 by different symbols for containers 2, 2' treated in treatment units 52a, 52b. According thereto, containers 2, 2' produced in treatment units 52a, 52b can also be advanced with the inclusion of secondary buffer device 54 in a mixed sequence on buffer area 3 of device 1 to its outfeed region 6 and distributed accordingly mixed to transport aisles 6b arranged next to one another. Containers 2, 2' with different filling materials and/or different container formats can therefore be fed in parallel to second treatment machine 53. This means that different container formats, so-called mixed packs, can be produced.

Figure 8:
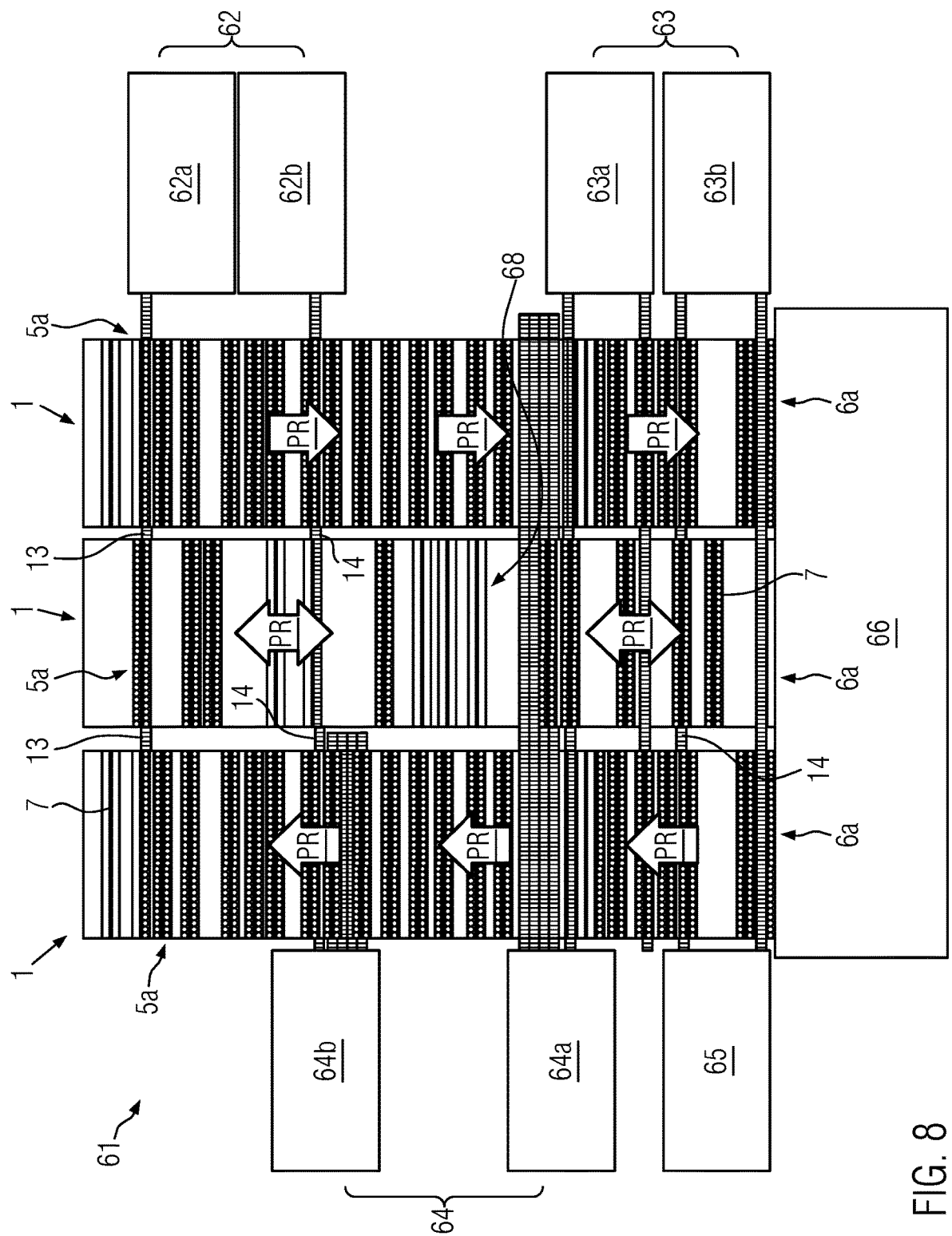
FIG. 8 shows a schematic top view onto a fourth integration of the device into a filling system.

FIG. 8 schematically shows a fourth filling system 61 with several devices 1 according to at least one of the embodiments described above, which are connected to one another by way of several branching conveyor belts 13, 14 transverse to respective buffering direction PR. Furthermore, at least one first treatment machine 62 with independent treatment units 62a, 62b, at least one second treatment machine 63 with independent treatment units 63a, 63b, at least one third treatment machine 64 with independent treatment units 64a, 64b, a buffer device 65 of conventional design and/or or a product storage 66 or the like can be connected.

Devices 1 are each arranged with respect to their buffering directions PR to be transverse to one another and are connected to one another transverse to respective buffering direction PR by infeed conveyor belts 5a, outfeed conveyor belts 6a, and/or branching conveyor belts 13, 14.

According thereto, buffering directions PR of individual devices 1 can also deviate from one another, can run, for example, in opposite directions. It is also conceivable that buffering direction PR of at least one of devices 1 can be revers able. This is indicated schematically in FIG. 8 for the center one of devices 1 by way of a double arrow.

First treatment machine 62 with its independent treatment units 62a, 62b is preferably used for a first production step, for example, for filling and closing containers 2. Second treatment machine 63 with its independent treatment units 63a, 63b is preferably used for a different processing step, for example, for packaging containers 2. Third treatment machine 64 with its independent treatment units 64a, 64b is preferably used for a processing step again differing therefrom, for example, for labeling containers 2.

For example, different filling materials and/or different container formats can be processed in the respective independent treatment units of the above treatment machines.

Flexible processing of different filling materials and/or container formats is possible with the filling system 61, as well as the possible integration of an empty shuttle buffer 68 on one of buffer areas 3 of device 1.

Conventional buffer 65 is, for example, a loop buffer or a spiral buffer.

Storage 66 can be used, for example, to store individual containers or groups of containers 2 separately, or also together with associated shuttles 7. Storage 66 can therefore be configured to store loaded shuttles 7 As a result, the buffer capacity of filling system 61 can be adjusted flexibly and, if necessary, also subsequently Storage 66 could also comprise several storage tiers in order to reduce the space required for filling system 61.

Figure 9:
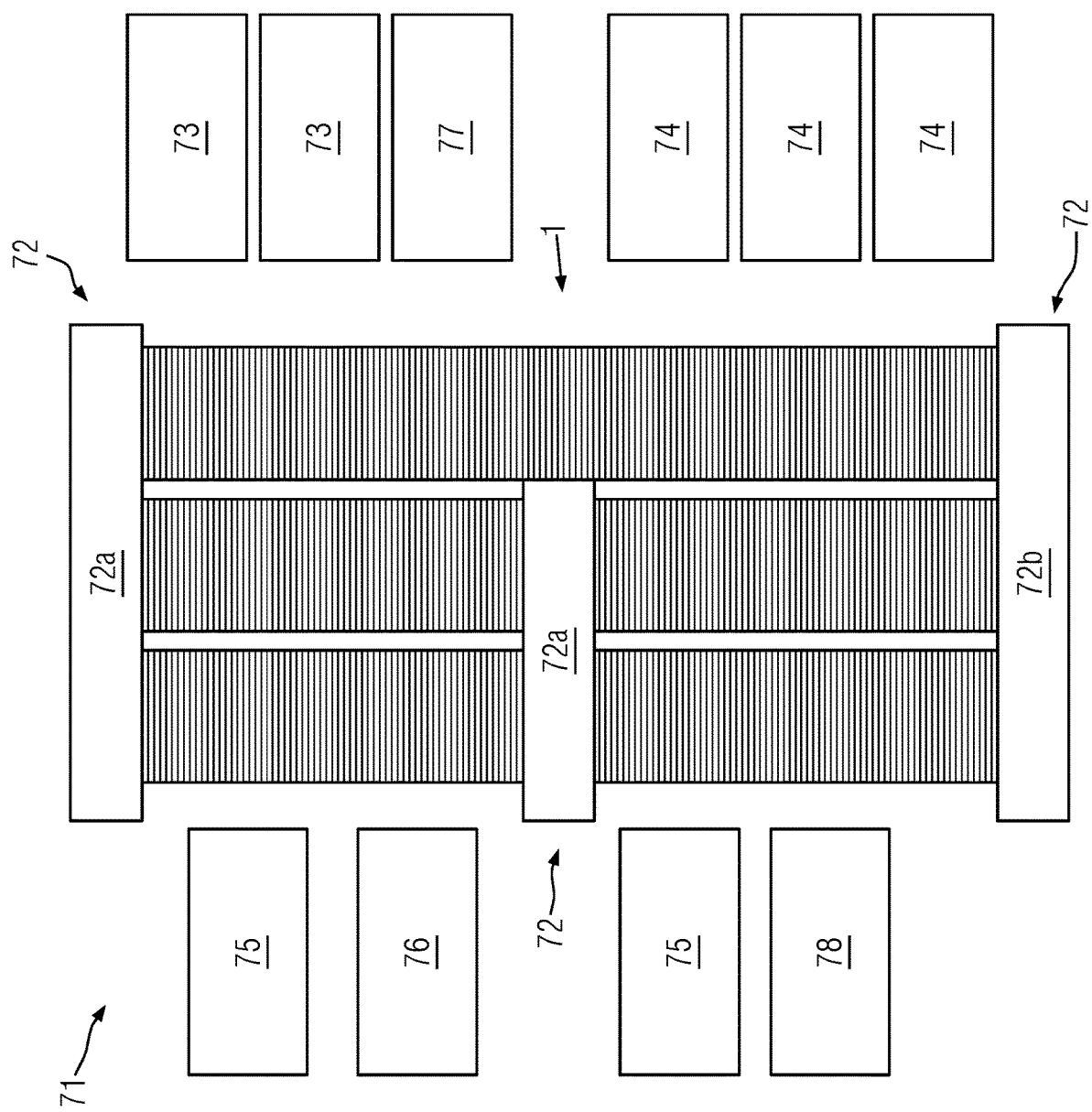
FIG. 9 shows a schematic top view onto a fifth integration of the device into a filling system.

FIG. 9 shows a diagram of a fifth filling system 71 in which unloaded shuttles 7 can be moved back and forth by way of a lifting system 72 between buffer areas 3 of individual devices 1 and at least one storage tier for empty and/or loaded shuttles 7 arranged thereabove.

A lifting system 72 with a first lift 72a on one of the face ends of device 1, a second lift 72b on the other face end of device 1, and a lift 72c arranged in therebetween and above at least two of buffer areas 3 is shown by way of example.

This means that loaded as well as empty shuttles 7 can be flexibly distributed over different tiers without having to guide shuttles 7 upside down on the respective upper tiers. This means that it is possible only with a lifting system 72 with lifts 72a, 72b, 72c to enter empty shuttles 7 in addition to loaded shuttles 7 into storage on different tiers of devices 1, to move them, and to remove them from storage again from there.

Furthermore shown for the sake of completeness are first treatment machines 73 for carrying out a first treatment step on containers 2, second treatment machines 74 for carrying out a second treatment step on containers 2, third treatment machines 75 for carrying out a third treatment step on containers 2, and a fourth treatment machine 76 for carrying out a fourth treatment step on containers 2, a fifth treatment machine 77 for carrying out a fifth treatment step on containers 2 and a sixth treatment machine 78 for carrying out a sixth treatment step on containers 2.

The first to sixth treatment steps preferably differ from one another and can also include or be an inspection of containers 2.

With device 1 described and its integration into filling systems 31, 41, 51, 61 and 71 described by way of example, flexible production concepts can be employed with regard to processing different filling materials and container formats and with regard to the management of different production states, for example, different system utilization, incidents of fault or the like with comparatively little required space while maintaining buffer operation without back pressure, i.e. without mutual back pressure of the containers.

However, it would also be desirable to shorten production change-over. This is for the reason that the container infeed into device 1 must in general be blocked, for example, in the region of an upstream track switch, once remaining containers 2 of a type from earlier production have entered. The remaining rows of containers 2a are conveyed and processed by device 1 to the extent possible. However, as soon as one or more lanes in the infeed of a packaging machine arranged downstream can no longer be filled, their infeed is blocked. The packaging machine is run empty and the remaining containers from the lanes may have to be removed manually. The format of the infeed, the shuttles, the outfeed of device 1 as well as the packaging machine is then changed over. After the changeover, the infeed block is lifted and the new type of containers is supplied.

Figure 10:
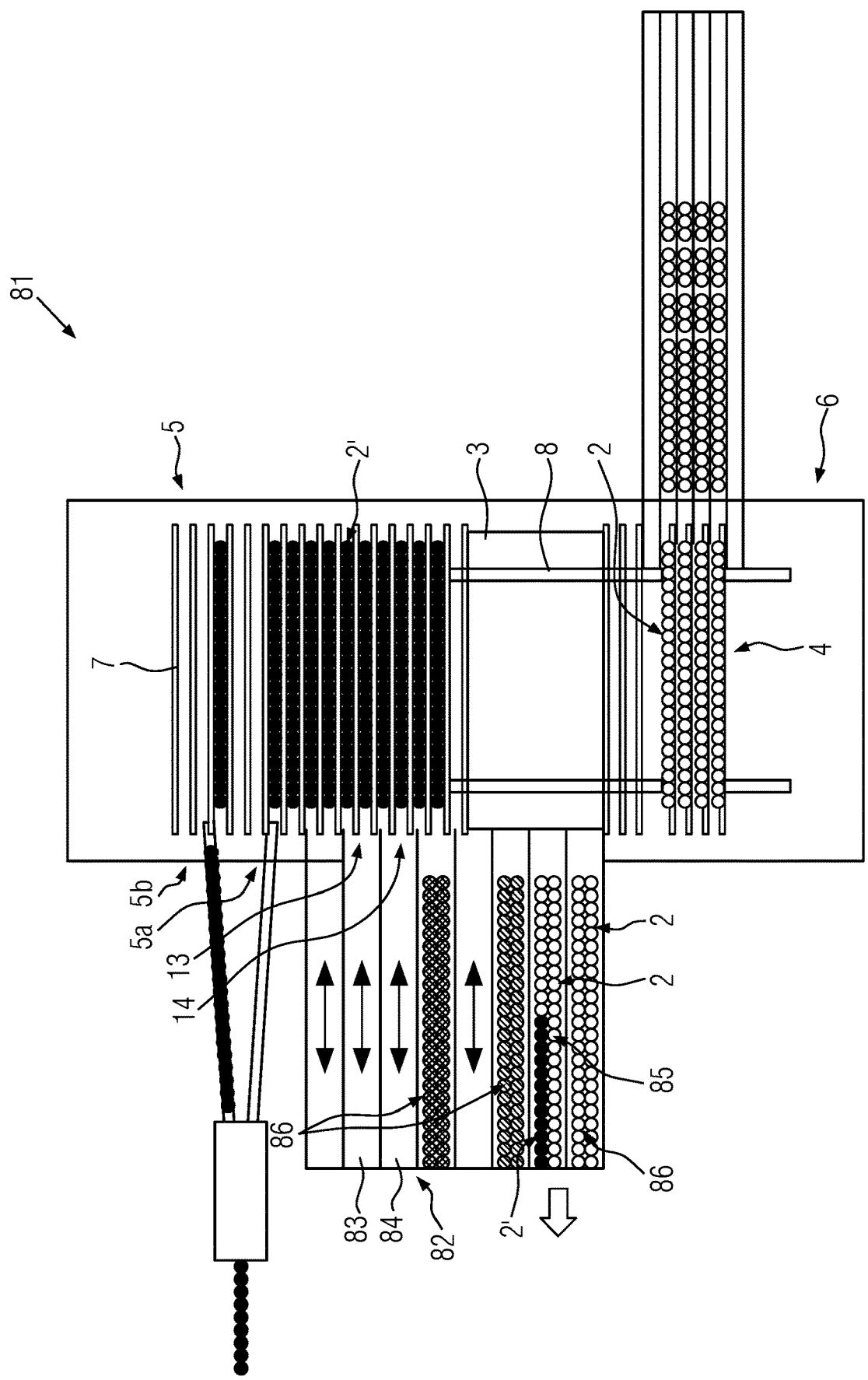
FIG. 10 shows a schematic top view onto a sixth integration of the device into a filling system.

Simplification in this regard is enabled by sixth filling system 81, shown schematically in FIG. 10, with device 1 and a remaining containers station 82 downstream of several preferably bidirectionally driven branching conveyor belts 13, 14. For this purpose, remaining containers station 82 can comprise, for example, storage belts 83, 84 configured as extensions of branching conveyor belts 13, 14. Branching conveyor belts 13, 14 could also extend into remaining containers station 82 accordingly.

Infeed region 5 of device 1 with infeed conveyor belts 5a, 5b, outfeed region 6 with outfeed conveyor belt 6a, buffer area 3, shuttles 7, and rails 8 of transport system 4 are furthermore shown by way of example.

The mode of operation of remaining containers station 82 when production is changed over from containers 2 from the earlier production to containers 2' from the new production without changing the container diameter is possible as follows.

Containers 2 of the earlier type of containers and containers 2' of the new type of containers can therefore follow one another without gaps in the region of the single-row feed to device 1.

A row pusher 9, 10 that as a result is not loaded with one type of earlier and new containers 2, 2' is emptied by one of branching conveyor belts 13, 14, and containers 2, 2' are parked as a result in container station 82 as a mixed bunch 85 of remaining containers from the earlier and the new production.

There could possibly also already be further bunches 86 of remaining containers of the same type from the earlier production in the packaging machine (not shown) downstream that are no longer to be processed for the time being. In principle, however, they can be led back into device 1 during the next production of the same type.

Bunches 85 of remaining containers that are not of the same type are removed from container station 82 or can be rearranged there to bunches 86 of remaining containers of the same type, in order to likewise be led in again during the next production run.

In order to prevent an undesired mixture of types in the packs to be produced in the packaging machine with a product changeover, the number of containers 2, 2' stored per row pusher 9, 10 can correspond, for example, to the multiple of containers 2, 2' required per pack in the transport direction (in the case illustrated, therefore a multiple of three). Alternatively, packs with an undesired mixture of types can be detected and lead out, for example, downstream of the packaging machine.

Changing the container diameter results, for example, in the following change of format:

Once the remaining containers 2 from the earlier production have been fed into device 1, the feed is blocked in order to subsequently adjust the feed and shuttles 7 manually or in an automated manner to the new container diameter, for example, in empty shuttle buffer 18.

After changing the feed and first available shuttles 7, the feed block is lifted and containers 2' of the new format are fed in immediately subsequently in order to avoid downtimes to the extent possible.

During the entire changeover phase, device 1 can process containers 2 from the earlier production without interruption, and excess bunches 85, 86 of remaining containers from the earlier production (as previously described) are transported to remaining containers station 82. A time-saving change of type/change of format is then possible on-the-fly.

The invention claimed is:

1. Method for buffering containers in a filling system, where containers are entered into storage grouped in a single row on at least one infeed conveyor belt, moved in a single row onto a buffer area adjoining in a transverse manner by rail-guided and individually driven shuttles with row pushers in a buffering direction running transverse to an infeed direction, and are removed from storage on at least one outfeed conveyor belt adjoining in the transverse manner in said buffering direction wherein, by way of first and second branching conveyor belts integrated into said buffer area, containers are furthermore removed from storage from said buffer area and/or entered into storage on said buffer area, transverse to the buffering direction and independently of said infeed conveyor belt and said outfeed conveyor belt, where:

the first branching conveyor belt is arranged anterior, when seen in the buffering direction, and removes containers from the buffer area, and the second branching conveyor belt is arranged posterior, when seen in the buffering direction, and enters containers onto the buffer area; or the first and second branching conveyor belts are driven with a reversible branching direction for selectively entering or removing containers into or from storage.

2. Method according to claim 1, where said containers are entered into storage by at least one of said branching conveyor belts, and where said containers entered into storage by said at least one infeed conveyor belt are treated, inspected, and/or stored immediately upstream in a manner differing from one another and/or separately from one another.

3. Method according to claim 2, where said containers removed from storage by at least one of said branching conveyor belts, and where said containers removed from storage by said at least one outfeed conveyor belt are treated, inspected and/or stored immediately downstream in a manner differing from one another and/or separately from one another.

4. Method according to claim 1, where said containers are removed from storage and entered into storage by way of at least two of said branching conveyor belts immediately before and/or after labelling, inspection, or buffering.

5. Method for buffering containers in a filling system, where containers are entered into storage grouped in a single row on at least one infeed conveyor belt, moved in a single row onto a buffer area adjoining in a transverse manner by rail-guided and individually driven shuttles with row pushers in a buffering direction running transverse to an infeed direction, and are removed from storage on at least one outfeed conveyor belt adjoining in the transverse manner in said buffering direction wherein, by way of branching conveyor belts integrated into said buffer area, containers are furthermore removed from storage from said buffer area and/or entered into storage on said buffer area, transverse to the buffering direction and independently of said infeed conveyor belt and said outfeed conveyor belt, where first containers with a first filling material and/or of a first container format are transported on said buffer area and second containers with a second filling material and/or of a second container format are removed from storage from a secondary buffer device by way of at least one of said branching conveyor belts and entered into storage in said row pushers, and where said first and said second containers are advanced as a mixed sequence, in row pushers loaded with either said first or said second containers, to an outfeed region and are guided there into transport aisles assigned either to said first or to said second containers, thus producing mixed container formats, so-called mixed packs.

6. Method according to claim 1, where, in the event of a change of product/change of format, excess containers from earlier production are led out downstream by at least one of said branching conveyor belts to a remaining containers station, with containers from the earlier and new production running in in a manner adjoining one another without gaps.

7. Method according to claim 1, where, during the removal from storage at at least one of said branching conveyor belts, emptied shuttles are moved away from/lifted off said buffer area by way of a connectable vertical track switch and subsequently temporarily stored.

8. Method according to claim 1, where, during the entry at at least one of said branching conveyor belts, shuttles to be loaded are moved/lowered onto said buffer area by way of a connectable vertical sorter after intermediate storage.

9. Method according to claim 1, where said row pushers pick up said groups of containers in a single row and on both sides between anterior and posterior row guides leading/trailing in said buffering direction.

10. Device for buffering containers grouped in a single row without back pressure in a filling system comprising a buffer area and a transport system arranged thereabove for moving said containers on said buffer area in a buffering direction from an infeed region with at least one infeed conveyor belt running transverse to said buffering direction to an outfeed region with at least one outfeed conveyor belt running transverse to said buffering direction, where said transport system comprises shuttles that are guided on rails and are driven independently of one another with row pushers aligned to be transverse to said buffering direction for moving said containers grouped in single rows, comprising first and second branching conveyor belts integrated into said buffer area which run transverse to said buffering direction and are driven independently of said infeed conveyor belt and of said outfeed conveyor belt for removing containers from storage from said buffer area in a single row and/or for entering them into storage in a single row thereon, where:
  the first branching conveyor belt is arranged anterior, when seen in the buffering direction, and is configured to remove containers from the buffer area, and the second branching conveyor belt is arranged posterior, when seen in the buffering direction, and is configured to enter containers onto the buffer area; or
  the first and second branching conveyor belts are configured to be driven with a reversible branching direction for selectively entering or removing containers into or from storage.

11. Device according to claim 10, where said transport system furthermore comprises an empty shuttle buffer and a connectable vertical track switch, each arranged above said buffer area, with which emptied shuttles can be guided during the removal from storage at at least one of said branching conveyor belts for intermediate storage from said buffer area into said empty shuttle buffer.

12. Device according to claim 10, where said transport system furthermore comprises an empty shuttle buffer and a connectable vertical track switch, each arranged above said buffer area, with which shuttles to be loaded can be guided during the entry into storage at at least one of said branching conveyor belts from said empty shuttle buffer into said buffer area.

13. Device according to claim 10, furthermore comprising a bypass conveyor belt which branches off by way of a horizontal track switch from the start/inlet of said infeed conveyor belt and establishes a connection for at least partial transport of said containers to the start/inlet of said outfeed conveyor belt.

14. Device according to claim 10, where said row pushers for guiding said containers in a single row on two sides each comprise a respective anterior row guide that is leading them in said buffering direction and a posterior row guide that is trailing said containers.

15. Device according to claim 10, where said row pushers are arranged in pairs on said shuttles.

16. Container treatment system with said device according to claim 10, further comprising a labeler, an inspection machine, and/or a further buffer device connected to at least two of said branching conveyor belts for said containers entered into storage and removed from storage by way of said branching conveyor belts.

17. Container treatment system according to claim 16, furthermore with a treatment machine for said containers that is connected upstream of said infeed conveyor belt, where said treatment machine is a blow-molding machine, filler/capper, or labeler or a combination of a blow-molding machine, a labeler, a filler and a capper, and a packaging machine and/or storage unit for said containers that is connected downstream of said outfeed conveyor belt.

18. Container treatment system, with said device according to claim 10, furthermore comprising a remaining containers station connected to at least one of said branching conveyor belts and/or formed by said branching conveyor belts for receiving containers in excess downstream of said device.

* * * * *